US 10,089,156 B2

(12) United States Patent
Bernasconi et al.

(10) Patent No.: US 10,089,156 B2
(45) Date of Patent: Oct. 2, 2018

(54) ELECTRONIC DEVICE FOR SYNCHRONIZING TASKS OF AN ELECTRONIC APPLIANCE

(71) Applicants: STMicroelectronics (Grenoble 2) SAS, Grenoble (FR); STMicroelectronics (Rousset) SAS, Rousset (FR)

(72) Inventors: Eric Bernasconi, Vence (FR); David Coupe, Valbonne (FR); Ludovic Chotard, Saint Egreve (FR); Pierre-François Pugibet, Grenoble (FR)

(73) Assignees: STMicroelectronics (Grenoble 2) SAS, Grenoble (FR); STMicroelectronics (Rousset) SAS, Rousset (FR)

( * ) Notice: Subject to any disclaimer, the term of this patent is extended or adjusted under 35 U.S.C. 154(b) by 195 days.

(21) Appl. No.: 14/929,106

(22) Filed: Oct. 30, 2015

(65) Prior Publication Data

US 2016/0299797 A1    Oct. 13, 2016

(30) Foreign Application Priority Data

Apr. 9, 2015  (FR) .................................... 15 53064

(51) Int. Cl.
*G06F 9/46* (2006.01)
*G06F 9/52* (2006.01)
*G06F 13/16* (2006.01)
*G06F 9/50* (2006.01)

(52) U.S. Cl.
CPC .............. *G06F 9/52* (2013.01); *G06F 9/5016* (2013.01); *G06F 9/5038* (2013.01); *G06F 13/16* (2013.01)

(58) Field of Classification Search
None
See application file for complete search history.

(56) References Cited

U.S. PATENT DOCUMENTS

| | | | |
|---|---|---|---|
| 6,038,618 A * | 3/2000 | Beer | H04L 12/437 710/18 |
| 2003/0172104 A1* | 9/2003 | Hooman | G06F 9/4881 718/103 |
| 2005/0060456 A1 | 3/2005 | Shrader et al. | |
| 2008/0121168 A1* | 5/2008 | Ryznar | G05B 19/41805 116/201 |
| 2012/0048843 A1* | 3/2012 | Feng | A47J 27/004 219/442 |

FOREIGN PATENT DOCUMENTS

WO    2012089579 A1    7/2012

* cited by examiner

*Primary Examiner* — Emerson Puente
*Assistant Examiner* — Steven Do
(74) *Attorney, Agent, or Firm* — Slater Matsil, LLP

(57) ABSTRACT

An electronic device can be used for synchronizing tasks of an appliance that includes a memory access controller having inputs associated with priority levels. The device includes control circuits configured for receiving signals from events and delivering in response signals for activation of tasks. A configurable interface for external events designed to receive first event signals from at least one circuit of the appliance and to route some of them to the corresponding control circuits as a function of a first law of correspondence. A configurable interface for internal events designed to receive second event signals corresponding to the signals for activation of tasks and to route some of them to the control circuits as a function of a second law of correspondence.

21 Claims, 1 Drawing Sheet

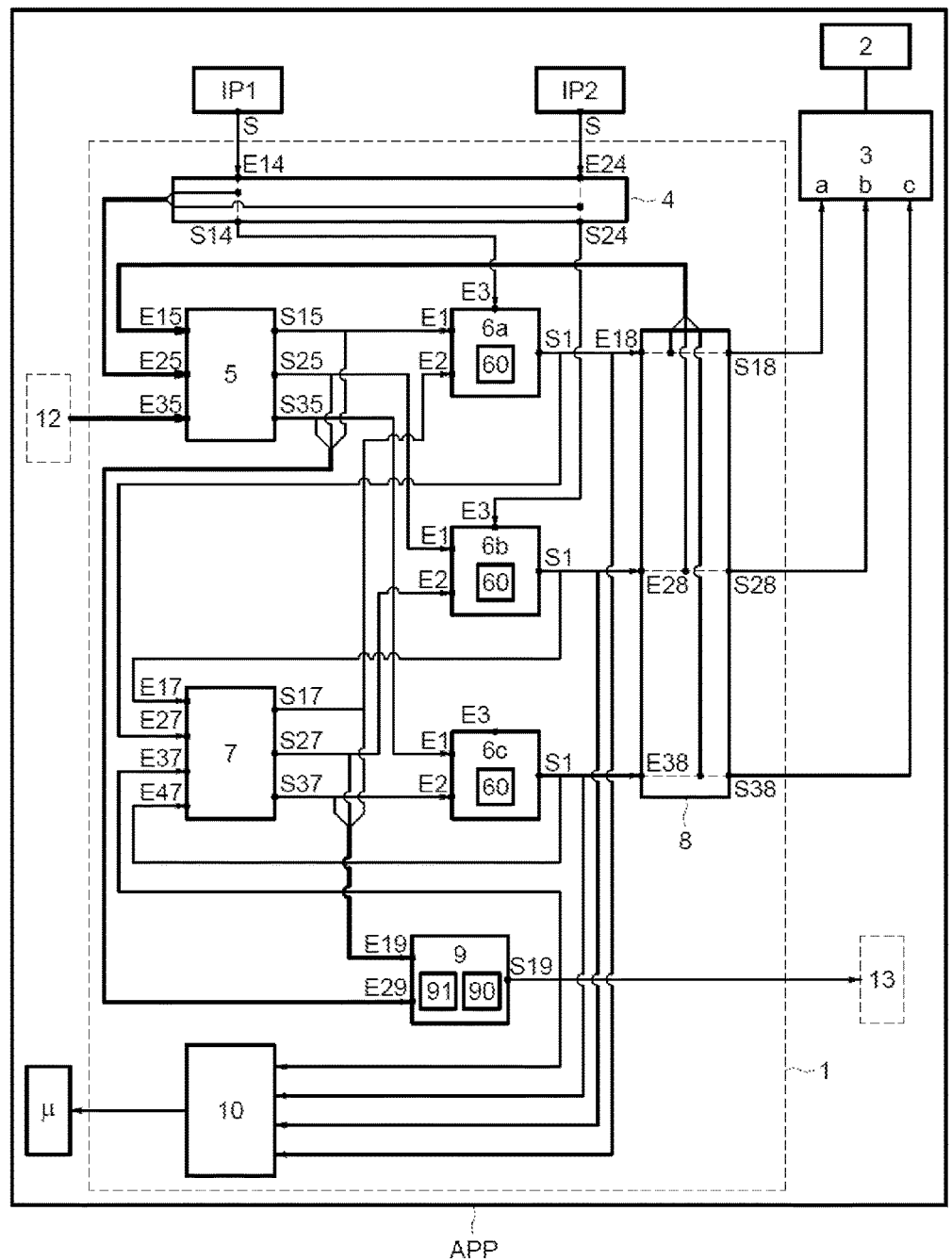

ELECTRONIC DEVICE FOR SYNCHRONIZING TASKS OF AN ELECTRONIC APPLIANCE

This application claims priority to French Patent Application No. 1553064, filed on Apr. 9, 2015, which application is hereby incorporated herein by reference.

TECHNICAL FIELD

Various embodiments of the invention relate to an electronic device designed to synchronize tasks of an electronic appliance.

BACKGROUND

Electronic appliances generally comprise a plurality of integrated circuits alternately processing data circulating within the electronic appliance and stored before and after the processing by one of the integrated circuits within an area of the, or of a, main memory of the electronic appliance.

In order to control the accesses to the memory of the various electronic circuits, an electronic appliance generally comprises a memory access controller or descriptor, also known under the acronym DMA (for Direct Memory Access). The memory access controller allows the direct control of the transfer of data between a peripheral device and a memory, irrespective of the direction of the transfer, without the intervention of a microprocessor except for launching and concluding the transfer.

A memory access controller thus avoids locking up, in other words rendering unavailable, the microprocessor during the execution of certain tasks of the various integrated circuits.

An electronic appliance comprising a memory access controller generally operates with the aid of a software application implementing a timing delay allowing the sequencing of the execution of the various tasks to be carried out by the integrated circuits.

In such a system, in order to be sure of activating each of the tasks at a time when the data are accessible and in the desired form, the time delay is generally maximized. In fact, the execution of a task is often triggered while the data to be processed by the integrated circuit for the task have already been available for some time.

Such a sequencing limits the speed of processing of the data and by consequently limits the usage capacities of an electronic system.

Such a system notably has a processing speed, and hence a performance, which is too slow to allow a use for data having to be processed on the fly, such as in the case of video applications, notably for "streaming" applications.

SUMMARY

Various embodiments of the invention relate to the management of the tasks of various integrated circuits of the same electronic appliance, and more particularly the time management and the sequencing of these tasks According to one embodiment, a device is provided for synchronization of the tasks of integrated circuits coupled, for at least some of them, to a memory access controller so as to allow the processing of data on the fly using an electronic architecture.

According to one aspect, an electronic device designed to synchronize tasks of an electronic appliance comprising at least one circuit and a memory access controller having inputs each associated with a priority level. The device comprises at least two control circuits configured for receiving signals from events and for delivering in response signals for activation of tasks. A configurable interface for external events is designed to receive first event signals from at least one circuit of the electronic appliance and to route at least some of these first event signals to the corresponding control circuits as a function of a first law of correspondence. A configurable interface for internal events is designed to receive second signals from events corresponding to the signals for activation of tasks delivered by the control circuits and to route at least some of them to the control circuits as a function of a second law of correspondence. The outputs from the control circuits are designed to be connected to the inputs of the memory access controller depending on the desired priority level for the tasks associated with the signals for activation of tasks delivered by each of the control circuits.

Such a device may correspond to an electronic device for controlling the path to be followed by the data, or Hardware Datapath Manager. The device is thus designed and configured for receiving the various events from the electronic appliance, notably relating to the completion of tasks, and for controlling the execution of a task following the completion of a preceding task without any latency time due to a timing delay.

The device more particularly allows the various circuits of the electronic appliance, and notably the integrated circuits coupled to the memory access controller, to be informed of the time when the data required for the execution of one of their tasks becomes available and to instruct the direct access controller to give immediate access to this data in memory.

Advantageously, the device may furthermore comprise an input interface configured for transmitting signals for activation of tasks generated by integrated circuits coupled to the memory access controller via the device to at least one of the control circuits, the at least one control circuit having a first mode of operation in which the control circuit transmits the signal for activation of tasks received upon reception of a first or second event signal, the integrated circuits being coupled to at least one of the control circuits via the input interface depending on the desired priority level for the tasks associated with the signals for activation of tasks delivered by the integrated circuits.

The input interface thus allows signals for activation of tasks generated by the integrated circuits to be transmitted to the memory access controller via the control circuits, directly or else following the reception of a first or second event signal depending on the mode of operation of the control circuit.

The first mode of operation, or filtering mode, is used for controlling the time at which the access to the memory access controller is given to an integrated circuit. It allows the tasks of the various integrated circuits to be synchronized.

More precisely, the filtering mode allows the transmission of a task activation signal by the control circuit in question to be triggered at the moment when a first or second event signal is received by the control circuit, the task activation signal corresponding to that delivered by an integrated circuit to the control circuit in question via the input interface.

The at least one control circuit may have a second mode of operation in which the control circuit generates and delivers a task activation signal upon reception of a first or second event signal.

The second mode of operation, or emulation mode, allows the activation of a task to be controlled by internal generation, by the control circuit, of a task activation signal, in other words without having received on the input interface a task activation signal coming from an integrated circuit.

In other words, the emulation mode allows the control of the transfer to the memory access controller of an event coming from the system in other words which does not originate from one of the integrated circuits, such as for example an event generated by an interrupt. The control circuit thus emulates the transmission of an event by an integrated circuit to the memory access controller. It emulates an integrated circuit that would need a transfer of data.

The incorporation of the emulation mode allows correspondingly more tasks operating within the electronic appliance to be synchronized.

The at least one control circuit may also exhibit a third mode of operation in which the control circuit operates as a simple electrical connector.

The third mode of operation, or "by-pass" mode, is a default mode, in which the control circuit is "transparent". This mode may be used for controlling the events received by the control circuit or else for generating events to the rest of the device or else to another control circuit.

Preferably, the at least one control circuit comprises an operational mode selector able to switch the operation of the control circuit between the first, the second and the third mode of operation.

The device may advantageously furthermore comprise at least one additional control circuit configured for receiving the first and second event signals, the at least one additional control circuit having a first mode of operation in which the at least one additional control circuit transforms the first or second event signal received into a corresponding task activation signal and delivers it via an output to a circuit of the electronic appliance without going via the output interface.

The device can thus, by virtue of the additional control circuit, control the circuits of the electronic appliance which require a start signal and notably those not communicating with the memory access controller.

The interface for external events allows the events to be received from such circuits, notably relating to the completion of tasks, and thus to control the circuits of the electronic appliance not communicating, or not communicating all the time, with the memory access controller in order to synchronize the tasks of all the circuits.

Preferably, the at least one additional control circuit also comprises a module for receiving a signal confirming reception of the task activation signal, or "acknowledge signal", the reception module being configured for detecting the reception at the input of the additional control circuit of the event corresponding to the task activation signal previously generated by the additional control circuit.

The reception module thus allows it to be verified that the circuit coupled to the output of the additional control circuit has indeed received the activation signal. This module thus allows a reception verification function, referred to as "handshaking," to be emulated.

The additional control circuit thus has the property of cumulating requests for activation of tasks in order to send them to a circuit of the electronic appliance which could not manage the cumulation of the requests when the request can be accepted. The additional control circuit allows a circuit of the appliance to be de-synchronized from the rest of the system without however losing the synchronization of the tasks of the appliance.

Advantageously, the at least one additional control circuit can have a second mode of operation in which the additional control circuit operates as a simple electrical connector.

The second mode of operation of the additional control circuit allows the event selected at the input of the additional control circuit to be directly routed to the output of the additional control circuit without modifying the signal. This second mode can be used for the detection of errors given that the events received may be observed and monitored during their passage through the additional control circuit, and that a comparison may be made between the event received and that transmitted by the additional control circuit.

Preferably, the at least one additional control circuit comprises an operational mode selector capable of switching the operation of the additional control circuit between the first mode of operation and a second mode of operation.

According to another aspect, an electronic appliance is provided comprising an electronic device such as defined hereinabove.

BRIEF DESCRIPTION OF THE DRAWINGS

Other advantages and features of the invention will become apparent upon examining the detailed description of one non-limiting embodiment of the invention and of the appended drawing, in which the single FIGURE shows schematically an electronic device for synchronization of tasks of an electronic appliance according to one embodiment of the invention.

DETAILED DESCRIPTION OF ILLUSTRATIVE EMBODIMENTS

The electronic appliance APP comprises an electronic device 1 for synchronization of the tasks coupled to a main memory 2 via a memory access controller 3. The electronic appliance APP furthermore comprises integrated circuits IP1 and IP2 each comprising an output for activation of tasks S coupled to the memory access controller 3 via the device 1. The outputs for activation of tasks S are configured for delivering signals for activation and control of data streams from the memory access controller 3.

The memory access controller 3 has several inputs a, b, c associated with different priority levels.

The electronic device for synchronization of tasks 1 comprises an input interface 4 comprising, in the embodiment illustrated, two inputs E14 and E24 coupled to the output S of the various integrated circuits IP1 and IP2. The input interface 4 is configured for receiving and for transmitting via two outputs S14 and S24 signals for activation of tasks generated by the integrated circuits IP1, IP2. The two outputs S14 and S24 are each connected to one of the two inputs E14, E24 of the input interface.

The device 1 furthermore comprises a configurable interface for external events 5, comprising a first bus input E35 able to receive first event signals generated by other circuits 12 of the electronic appliance APP. The bus connected to the first input E35 allows the signals from the circuits 12 of the electronic appliance APP to be assembled and re-synchronized.

The device 1 also comprises, in this embodiment, three control circuits 6a, 6b, 6c configured for delivering signals for activation of tasks. The three control circuits 6a, 6b and 6c each comprise a first and a second event input, respectively referenced E1 and E2, and an output S1 designed to deliver task activation signals.

The interface for external events 5 comprises three outputs S15, S25, S35 respectively coupled to the first input E1 of the three control circuits 6a, 6b, 6c. The interface for external events 5 thus comprises an output S15, S25, S35 for each control circuit 6a, 6b, 6c. The interface for external events 5 is configured for processing the first event signals received by means of a first law of correspondence and delivering certain of the first event signals to the corresponding control circuits 6a, 6b, 6c via the corresponding outputs S15, S25, S35.

The control circuits 6a, 6b, 6c furthermore comprise a task input designed to be coupled to an output S14, S24 of the input interface 4. In the embodiment illustrated, the task input E3 of each of the first two control circuits 6a, 6b is coupled to a separate output, respectively E14 and E24, of the input interface 4, whereas no output from the input interface 4 is coupled to the task input E3 of the third control circuit 6c.

The device 1 also comprises a configurable interface for internal events 7 comprising three inputs E17, E27, E47 respectively coupled to the output S1 of the control circuits 6a, 6b, 6c and outputs S17, S27, S37 respectively coupled to the second events input E2 of the control circuits 6a, 6b, 6c. The interface for internal events 7 is configured for processing, by means of a second law of correspondence, the second event signals relating to events corresponding to the signals for activation of tasks that the interface for internal events 7 has received and for delivering certain of the second event signals to at least one of the control circuits 6a, 6b, 6c.

In another embodiment, the device 1 can also comprise a software block for internal generation of events. This software block for internal generation of events thus allows a software action to be used for generating an event in place of a signal coming from a hardware electronic module. This software block for internal generation of events thus offers the possibility of a software/hardware management, in other words a cooperative management between the software modules and the hardware modules, in the case notably of a hybrid implementation.

Each control circuit 6a, 6b, 6c is configured for delivering signals for activation of tasks.

Each control circuit 6a, 6b, 6c has three modes of operation: an emulation mode, a filtering mode and a "by-pass" mode. Each control circuit 6a, 6b, 6c furthermore comprises a operational mode selector 60 allowing the operation of the control circuit 6a, 6b, 6c to be switched between the three modes of operation.

In emulation mode and the filtering mode, a control circuit 6a, 6b, 6c is configured to deliver them following the reception of a first or second event signal which may be coming from the interface for external events 5 or from the interface for internal events 7.

In "by-pass" mode, the control circuit 6a, 6b, 6c is "transparent", in other words the task activation signal received from the input interface 4 is transmitted without time delay and without modification. The control circuit 6a, 6b, 6c does not therefore wait for the reception of a first or second event signal in order to transmit the task activation signal. Moreover, in this mode, the control circuit cannot generate any task activation signals by itself upon receiving first or second event signals.

In filtering mode, the control circuit 6a, 6b, 6c triggers the transmission of a task activation signal delivered by the input interface 4 at the moment when a first or second event signal is received by the control circuit 6a, 6b, 6c.

The filtering mode and the "by-pass" mode may be used only in the case where one of the inputs of the control circuit 6a, 6b, 6c is electrically connected to an output of the input interface 4, as is the case for the first two control circuits 6a and 6b.

In emulation mode, the control circuit 6a, 6b, 6c generates and delivers a task activation signal upon receiving first or second event signals.

In order to use the emulation mode the control circuit 6a, 6b, 6c does not need to be connected to the input interface 4. The third input circuit 6c of the embodiment illustrated operates in emulation mode.

The filtering and emulation modes thus allow a maximum of tasks of the electronic appliance APP to be synchronized.

In the embodiment illustrated in the FIGURE, the first two control circuits 6a and 6b can operate in any of the three modes, and notably the filtering mode, and the third control circuit 6c can only operate in emulation mode given that its third input E3 is not coupled to an output of the input interface 4, and more particularly an output of the input interface connected to an input connected to an integrated circuit.

The device 1 furthermore comprises an output interface 8 comprising inputs E18, E28, E38 respectively connected to the output S1 of the control circuits 6a, 6b, 6c and outputs S18, S28, S38 connected to the inputs E18, E28, E38. The output interface 8 is configured for transmitting the signals for activation of tasks delivered by the control circuits 6a, 6b, 6c to the inputs a, b, c of the memory access controller 3.

When the device 1 is installed in the electronic appliance APP, the outputs S18, S28, S38 of the output interface 8 are electrically connected to the inputs a, b, c of the memory access controller 3 depending on the desired priority level for the tasks associated with the signals for activation of tasks delivered by each of the control circuits 6a, 6b, 6c.

The cabling inside of the device 1 is fixed. Consequently, in order to intervene on the order of processing of the tasks, a user only has to change the cabling at the input of the device 1, notably between the integrated circuits IP1, IP2 and the input interface 4 of the device 1, and/or at the output of the device 1, notably between the output interface 8 of the device 1 and the memory access controller 3.

In other words, the electrical coupling between the outputs S1 of the various control circuits 6a, 6b, 6c and the inputs E18, E28, E38 of the output interface 8 is fixed and unchangeable inside of the device 1, whereas the cabling between the outputs S18, S28, S38 of the output interface 8 and the inputs a, b, c of the memory access controller 3 is implemented by an installer such that the signals for activation of tasks delivered by each of the control circuits 6a, 6b, 6c are associated with a given priority level, given that each input a, b, c of the memory access controller 3 is associated with a certain priority.

Thus, each task activation signal delivered by a control circuit 6a, 6b, 6c is associated with a priority level with respect to the other signals for activation of tasks by virtue of the cabling between the control circuits 6a, 6b, 6c, the output interface 8 and the memory access controller 3.

Similarly, each activation signal delivered by an integrated circuit IP1, IP2 to the input interface 4 is associated by a user during the installation with a priority level by virtue of the internal cabling of the device 1 between the inputs E14, E24 of the input interface 4 and the control circuits 6a and 6b and of the cabling between the control circuits 6a, 6b, 6c, the output interface 8 and the memory access controller 3.

The inputs E14, E24 of the input interface 4 are therefore electrically connected to the integrated circuits IP1, IP2 depending on the desired priority level for the tasks associated with the signals for activation of tasks delivered by the integrated circuits IP1, IP2. In order to modify the priority levels associated with the tasks, the user therefore only has to change the order of the cables coupled to the outputs S18, S28, S38 of the output interface 8 if he/she cannot intervene on the inputs E14, E24 of the input interface 4, or inversely to change the order of the cables coupled to the inputs E14, E24 of the input interface 4 if he/she cannot intervene on the outputs 18, S28, S38 of the output interface 8.

The first and second laws of correspondences governing the processing of the first and second events by the interface for external events 5 and the interface for internal events 7 is programmable by a user notably during the installation. The programming may be adapted according to the cabling implemented between the integrated circuits IP1 and IP2 and the input interface and depending on the mode of operation in which each integrated circuit is placed. The parameter setting of the first and second laws of correspondence of the interface for external events 5 and of the interface for internal events 7 is carried out by the user in such a manner as to specify for each control circuit 6a, 6b, 6c which event, external or internal, is to be transmitted by the interface for external events 5 or the interface for internal events 7 so as to trigger the delivery of a signal for activation of tasks by the control circuit 6a, 6b, 6c.

In emulation mode, in order to take into account all of the events relating to the tasks of the electronic appliance APP, the outputs S18, S28, S38 of the output interface 8 and the outputs S14, S24 of the input interface 4 are respectively coupled to a second input E15 and a third bus input E35 of the interface for external events 5. Thus, the generation of a signal for activation of tasks by the input interface 4 or the output interface 8 may be correctly interpreted by the interface for external events 5 and a corresponding first event signal can be delivered to the control circuits 6a, 6b, 6c. The control circuits 6a, 6b, 6c can thus take into account this first event signal in order to generate, where required, another task activation signal.

In the embodiment illustrated in the single FIGURE, the device 1 furthermore comprises an additional control circuit 9 having two modes of operation and comprising two bus inputs E19, E29 respectively coupled to the outputs S17, S27, S37 of the interface for internal events 7 and to the outputs S15, S25, S35 of the interface for external events 5 and an output S19.

The first mode of operation of the additional control circuit 9 is configured for transforming a first or second event signal received on one of the two bus inputs E19, E29 into a corresponding task activation signal and for delivering it via its output S19 to a circuit 13 of the electronic appliance APP, without going via the output interface 8, depending on the signals delivered by the interface for external events 5 and/or the interface for internal events 7.

The coupling of the outputs S18, S28, S38 of the output interface 8 and of the outputs S14, S24 of the input interface 4 at the input of the interface for external events 5 allows all of the events relating to the tasks of the electronic appliance APP to be taken into account for the operation of the additional control circuit 9 in its first mode of operation. Thus, the generation of a task activation signal by the input interface 4 or the output interface 8 can be correctly interpreted by the interface for external events 5 and a first event signal can be delivered to the additional control circuit 9 in order to be transformed into another associated task activation signal.

The additional control circuit 9 thus allows the device 1 to control the circuits of the electronic appliance APP which need a start signal and notably those not communicating with the memory access controller 3.

The interface for internal events 7 furthermore comprises an additional input E37 coupled to the output S19 of the additional control circuit 9 so as to furthermore take into account the events relating to the signals delivered by the additional control circuit 9. The second law of correspondence is programmed to take into account the signals received on the additional input E37.

The additional control circuit 9 furthermore incorporates a module 91 for receiving a signal confirming reception of the transmitted signal which thus allows it to be verified that the circuit 13 coupled at the output of the additional control circuit 9 has indeed received the task activation signal delivered by the latter.

The module 91 for receiving a signal confirming reception is coupled to the inputs E19, E29 of the additional control circuit 9. The receiver module 91 is configured for detecting the reception on the inputs E19, E29 of the additional control circuit 9 of the event corresponding to the task activation signal previously by the additional control circuit 9.

The additional control circuit 9 can format the signal delivered by the output S19 so that the latter is adapted for a correct interpretation by the circuit 13.

In the second mode of operation of the additional control circuit 9, the additional control circuit 9 operates in "by-pass" mode as a simple electrical connector, in other words it routes directly an event received at the input of the additional control circuit 9 to the output of the additional control circuit 9 without modifying the signal. The mode "by-pass" is useful for presenting any given event signal, arriving on the inputs E15, E25, E35, E17, E37, E47, via a single output S19.

In order to go from the first to the second mode of operation and vice versa, the additional control circuit 9 comprises an operational mode selector 90.

The device 1 for synchronization of the tasks also comprises an interrupt block 10 whose inputs are coupled to the outputs of the control circuits 6 and to the output of the additional control circuit 9. The interrupt block 10 is coupled at the output to a microprocessor µ of the electronic appliance APP.

The various circuits of the device 1 may be formed by algorithms for synthesis of logic circuits and/or by software, such as for example the interface for external events 5 and the interface for internal events 7.

The device for synchronization of the tasks of integrated circuits coupled, for at least some of them, to a memory access controller thus allows data to be processed on the fly using an electronic architecture.

What is claimed is:

1. An electronic device configured to synchronize tasks of an electronic appliance that comprises a first circuit and a memory access controller having a plurality of inputs, each input of the memory access controller being associated with a priority level, the electronic device comprising:
   a plurality of event control circuits, each of the plurality of event control circuits having a respective output configured to be coupled to a respective input of the plurality of inputs of the memory access controller, each of the plurality of event control circuits configured to receive event signals and, in response, to deliver, at the respective output, response event signals for activation of tasks;

a configurable external event circuit having outputs directly connected to the plurality of event control circuits, the configurable external event circuit configured to receive an external event signal from the first circuit of the electronic appliance and to route the external event signal to an event control circuit of the plurality of event control circuits as a function of a first law of correspondence; and a configurable internal event circuit having outputs directly connected to the plurality of event control circuits and inputs directly connected to respective outputs of the plurality of event control circuits and configured to receive a subset of the response event signals and to route the subset of the response event signals to one or more event control circuits of the plurality of event control circuits as a function of a second law of correspondence, wherein the first law of correspondence and the second law of correspondence specify which events trigger delivery of response event signals for activation of tasks by the plurality of event control circuits.

2. The electronic device according to claim 1, further comprising an input interface configured to be coupled to integrated circuits, the input interface configured to transmit signals for activation of tasks generated by the integrated circuits to a subset of the plurality of event control circuits, each event control circuit of the subset of the plurality of event control circuits having a first mode of operation in which each event control circuit of the subset of the plurality of event control circuits transmits a task activation signal received upon reception of a first or second event signal.

3. The electronic device according to claim 2, wherein each event control circuit of the subset of the plurality of event control circuits has a second mode of operation in which each event control circuit of the subset of the plurality of event control circuits generates and delivers a task activation signal upon reception of the first or second event signal.

4. The electronic device according to claim 1, wherein each event control circuit of the plurality of event control circuits has a third mode of operation in which each event control circuit of the plurality of event control circuits operates as an electrical connector.

5. The electronic device according to claim 3,
wherein each event control circuit of the subset of the plurality of event control circuits has a third mode of operation in which each event control circuit of the subset of the plurality of event control circuits operates as an electrical connector.

6. The electronic device according to claim 5, wherein each event control circuit of the subset of the plurality of event control circuits comprises an operational mode selector configured to switch between the first, the second and the third mode of operation.

7. The electronic device according to claim 1, further comprising an additional control circuit comprising inputs coupled to inputs of the plurality of event control circuits and an output configured to be coupled to a second circuit, the inputs of the additional control circuit configured to receive event signals, the additional control circuit having a first mode of operation in which the additional control circuit transforms the event signals received by the additional control circuit into corresponding task activation signals at the output of the additional control circuit.

8. The electronic device according to claim 7, wherein the additional control circuit further comprises a module configured to receive a signal confirming reception of the task activation signals to detect the reception at the inputs of the additional control circuit of the events corresponding to the task activation signals previously generated by the additional control circuit.

9. The electronic device according to claim 7, wherein the additional control circuit has a second mode of operation in which the additional control circuit operates as an electrical connector.

10. The electronic device according to claim 9, wherein the additional control circuit further comprises an operational mode selector configured to switch between the first mode of operation and the second mode of operation.

11. An electronic device designed to synchronize tasks of an electronic appliance that comprises a first circuit and a memory access controller having a plurality of inputs, each input of the memory access controller being associated with a priority level, the electronic device comprising:

a plurality of event control circuit means, each of the plurality of event control circuit means having a respective output configured to be coupled to a respective input of the plurality of inputs of the memory access controller, each control means for receiving event signals and, in response, for delivering, at the respective output, response event signals for activation of tasks;

external circuit means for receiving an external event signal from the first circuit of the electronic appliance and for routing the external event signal to an event control circuit means of the plurality of event control circuit means as a function of a first law of correspondence, wherein the external circuit means has outputs directly connected to the plurality of event control circuit means; and internal circuit means having outputs directly connected to the plurality of event control circuit means and inputs directly connected to respective outputs of the event control circuit means for receiving a subset of the response event signals and for routing the subset of the response event signals to one or more event control circuit means of the plurality of event control circuit means as a function of a second law of correspondence, wherein the first law of correspondence and the second law of correspondence specify which events trigger delivery of response event signals for activation of tasks by the plurality of event control circuits means.

12. An electronic appliance comprising:
a first circuit;
a memory access controller having a plurality of inputs, each of the plurality of inputs of the memory access controller being associated with a priority level;
a plurality of event control circuits, each of the plurality of event control circuits having a respective output coupled to a respective input of the plurality of inputs of the memory access controller, each of the plurality of event control circuits configured to receive event signals and, in response, to deliver, at the respective output, response event signals for activation of tasks;
a configurable external event circuit having outputs directly connected to the plurality of event control circuits, the configurable external event circuit configured to receive an external event signal from the first circuit of the electronic appliance and to route the external event signal to an event control circuit of the plurality of event control circuits as a function of a first law of correspondence; and
a configurable internal event circuit having outputs directly connected to the plurality of event control circuits and inputs coupled to respective outputs of the plurality of event control circuits and configured to receive a subset of the response event signals and to route the subset of the response event signals to one or more of the event control circuits as a function of a second law of correspondence, wherein the first law of correspondence and the second law of correspondence specify which events trigger delivery of response event signals for activation of tasks by the plurality of event control circuits.

13. The electronic appliance according to claim 12, further comprising an input interface configured to be coupled to integrated circuits, the input interface configured to transmit signals for activation of tasks generated by the integrated circuits to a subset of the plurality of event control circuits of the plurality of event control circuits, each event control circuit of the subset of the plurality of event control circuits having a first mode of operation in which each event control circuit of the subset of the plurality of event control circuits transmits a task activation signal received upon reception of a first or second event signal.

14. The electronic appliance according to claim 13, wherein each event control circuit of the subset of the plurality of event control circuits has a second mode of operation in which each event control circuit of the subset of the plurality of event control circuits generates and delivers a task activation signal upon reception of the first or second event signal.

15. The electronic appliance according to claim 12, wherein each event control circuit of the plurality of event control circuits has a third mode of operation in which each event control circuit of the plurality of event control circuits operates as an electrical connector.

16. The electronic appliance according to claim 14, wherein each event control circuit of the subset of the plurality of event control circuits has a third mode of operation in which each event control circuit of the subset of the plurality of event control circuits operates as an electrical connector; and wherein each event control circuit of the subset of the plurality of event control circuits comprises an operational mode selector configured to switch t between the first, the second and the third mode of operation.

17. The electronic appliance according to claim 12, further comprising an additional control circuit having inputs coupled to inputs of the plurality of event control circuits and an output configured to be coupled a second circuit, the inputs of the additional control circuit configured to receive event signals, the additional control circuit having a first mode of operation in which the additional control circuit transforms the event signals received by the additional control circuit into corresponding task activation signals at the output of the additional control circuit.

18. The electronic appliance according to claim 17, wherein the additional control circuit further comprises a module configured to receive a signal confirming reception of the task activation signals to detect the reception at the inputs of the additional control circuit of the events corresponding to the task activation signals previously generated by the additional control circuit.

19. The electronic appliance according to claim 17, wherein the additional control circuit has a second mode of operation in which the additional control circuit operates as an electrical connector.

20. The electronic appliance according to claim 19, wherein the additional control circuit comprises an operational mode selector configured to switch between the first mode of operation and a second mode of operation.

21. A method for synchronizing tasks of an electronic appliance, the method comprising:
    receiving, at respective inputs of each of a plurality of event control circuits, event signals;
    delivering, at respective outputs of each of the plurality of event control circuits, response event signals for activation of tasks based on the received event signals, the respective output of each of the plurality of event control circuits coupled to a respective input of a memory access controller of the electronic appliance, each of the respective inputs of the memory access controller being associated with a priority level;
    receiving, with a configurable external circuit that has outputs directly connected to the plurality of event control circuits, an external event signal from a first circuit of the electronic appliance;
    routing, with the configurable external circuit, the external event signal to an event control circuit of the plurality of event control circuits as a function of a first law of correspondence;
    receiving, at inputs of a configurable internal event circuit, a subset of the response event signals, each input of the configurable internal event circuit directly connected to respective outputs of the plurality of event control circuits, the configurable internal event circuit having outputs directly connected to the plurality of event control circuits; and
    routing, with the configurable internal event circuit, the subset of the response event signals to one or more event control circuits of the plurality of event control circuits as a function of a second law of correspondence, wherein the first law of correspondence and the second law of correspondence specify which events trigger delivery of response event signals for activation of tasks by the plurality of event control circuits.

* * * * *